United States Patent
Bhamri et al.

(10) Patent No.: US 11,664,845 B2
(45) Date of Patent: *May 30, 2023

(54) DEVICE SYSTEM AND METHOD FOR NEW RADIO (NR) COMMUNICATION

(71) Applicant: Panasonic Intellectual Property Corporation of America, Torrance, CA (US)

(72) Inventors: Ankit Bhamri, Langen (DE); Hidetoshi Suzuki, Kanagawa (JP); Quan Kuang, Langen (DE); David Gonzalez, Langen (DE); Rikin Shah, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/364,353

(22) Filed: Jun. 30, 2021

(65) Prior Publication Data

US 2021/0328622 A1    Oct. 21, 2021

Related U.S. Application Data

(63) Continuation of application No. 16/997,149, filed on Aug. 19, 2020, now Pat. No. 11,082,085, which is a (Continued)

(30) Foreign Application Priority Data

Feb. 23, 2018  (EP) .................................. 18158478

(51) Int. Cl.
*H04B 1/7143* (2011.01)
*H04B 1/7156* (2011.01)

(52) U.S. Cl.
CPC ......... *H04B 1/7143* (2013.01); *H04B 1/7156* (2013.01); *H04B 2201/696* (2013.01)

(58) Field of Classification Search
CPC ................ H04B 1/7143; H04B 1/7156; H04B 2201/696
(Continued)

(56) References Cited

U.S. PATENT DOCUMENTS 10,652,889 B2    5/2020  Yerramalli et al.
2012/0069831 A1  3/2012  Miki et al.
(Continued)

FOREIGN PATENT DOCUMENTS

EP    3681116 A1    7/2020
EP    3713100 A1    9/2020
(Continued)

OTHER PUBLICATIONS

3GPP TR 38.801 V14.0.0, "3rd Generation Partnership Project; Technical Specification Group Radio Access Network; Study on new radio access technology; Radio access architecture and interfaces (Release 14)," Mar. 2017, 91 pages.
(Continued)

*Primary Examiner* — Hirdepal Singh
(74) *Attorney, Agent, or Firm* — Seed IP Law Group LLP

(57) ABSTRACT

The disclosure relates to a communication device, a base station and respective integrated circuits and methods for a communication device and a base station. The communication device comprises a transceiver which, in operation, receives, from a base station, a hopping pattern indicator, a hopping pattern being an order of a plurality of bandwidth parts by which a signal is to be received or transmitted in a plurality of transmission time intervals, TTIs, a bandwidth part being formed by at least one physical resource block. The communication device further comprises circuitry
(Continued)

which, in operation, determines a hopping pattern to be applied based on the hopping pattern indicator. The transceiver, in operation, further receives or transmits the signal in the plurality of TTIs according to the determined hopping pattern.

11 Claims, 8 Drawing Sheets

Related U.S. Application Data continuation of application No. PCT/EP2019/053282, filed on Feb. 11, 2019.

(58) Field of Classification Search
USPC .......................................................... 375/134
See application file for complete search history.

(56) References Cited

U.S. PATENT DOCUMENTS

| | | | |
|---|---|---|---|
| 2016/0057798 | A1 | 2/2016 | Chae et al. |
| 2018/0048413 | A1 | 2/2018 | Liu et al. |
| 2018/0109286 | A1* | 4/2018 | Yao .......................... H04W 4/70 |
| 2018/0131483 | A1* | 5/2018 | Somichetty ........... H04L 5/0094 |
| 2020/0059332 | A1 | 2/2020 | Takeda et al. |
| 2020/0195389 | A1 | 6/2020 | Basu Mallick et al. |
| 2020/0266852 | A1 | 8/2020 | Kilian et al. |
| 2020/0305146 | A1 | 9/2020 | Matsumura et al. |
| 2021/0211254 | A1* | 7/2021 | Park ..................... H04B 7/0456 |

FOREIGN PATENT DOCUMENTS

| | | |
|---|---|---|
| JP | 2010178129 A | 8/2010 |
| JP | 2010219804 A | 9/2010 |
| WO | 2016/164028 A1 | 10/2016 |

OTHER PUBLICATIONS

3GPP TR 38.804 V14.0.0, "3$^{rd}$ Generation Partnership Project; Technical Specification Group Radio Access Network; Study on New Radio Access Technology; Radio Interface Protocol Aspects (Release 14)," Mar. 2017, 57 pages.
3GPP TR 38.913 V14.3.0, "3$^{rd}$ Generation Partnership Project; Technical Specification Group Radio Access Network; Study on Scenarios and Requirements for Next Generation Access Technologies; (Release 14)," Jun. 2017, 39 pages.
3GPP TS 38.211 V15.0.0, "3$^{rd}$ Generation Partnership Project; Technical Specification Group Radio Access Network; NR; Physical channels and modulation (Release 15)," Dec. 2017, 73 pages.
3GPP TS 38.212 V15.0.0, "3$^{rd}$ Generation Partnership Project; Technical Specification Group Radio Access Network; NR; Multiplexing and channel coding (Release 15)," Dec. 2017, 82 pages.
3GPP TS 38.300 V15.0.0, "3$^{rd}$ Generation Partnership Project; Technical Specification Group Radio Access Network; NR; NR and NG-RAN Overall Description; Stage 2 (Release 15)," Dec. 2017, 68 pages.
3GPP TS 38.331 V0.0.1, "3$^{rd}$ Generation Partnership Project; Technical Specification Group Radio Access Network; NR; Radio Resource Control (RRC); Protocol specification (Release 15)," Mar. 2017, 13 pages.
Ericsson, "Remaining issues of the DCI contents and formats," R1-1802905, Agenda Item: 7.1.3.1.4, 3GPP TSG-RAN WG1 #92, Athens, Greece, Feb. 26-Mar. 2, 2018, 12 pages.
Ericsson, "NR High-Reliability URLLC scope for RAN1/RAN2," RP-172817, Agenda Item: 9.2.1, 6 pages.
Extended European Search Report, dated Aug. 21, 2018, for European Application No. 1815 8478.0-1220, 11 pages.
International Search Report, dated Apr. 15, 2019, for International Application No. PCT/EP2019/053282, 3 pages.
International Telecommunication Union, "IMT Vision—Framework and overall objectives of the future development of IMT for 2020 and beyond," Recommendation ITU-R M.2083-0, Sep. 2015, 21 pages.
Nokia, Nokia Shanghai Bell, "On resource allocation for PDSCH and PUSCH in NR," R1-1715545, Agenda item: 6.3.3.1, 3GPP TSG RAN WG1 NRAH#3, Nagoya, Japan, Sep. 18-21, 2017, 10 pages.
NTT Docomo, Inc., "Revised WID on New Radio Access Technology," RP-172115, Agenda Item: 9.2.1, 3GPP TSG RAN Meeting #77, Sapporo, Japan, Sep. 11-14, 2017, 11 pages.
Samsung, "Bandwidth Part Hopping for CORESETS," R1-1713621, Agenda item: 6.1.3.1.6, 3GPP TSG RAN WG1 #90, Prague, Czech Republic, Aug. 21-25, 2017, 4 pages.
European Communication, dated Dec. 14, 2022, for European Application No. 19 702 932.5-1206. (5 pages).
Catt, "Further details for UL transmission procedures," R1-1720205, Agenda Item: 7.3.3.4, 3GPP TSG RAN WG1 Meeting #91, Reno, USA, Nov. 27-Dec. 1, 2017. (5 pages).
InterDigital Inc., "Control Plane Impacts of BWP," R2-1712795, Agenda Item: 10.2.3, 3GPP TSG-RAN WG2 Meeting #100, Reno, USA, Nov. 27-Dec. 1, 2017. (4 pages).
Japanese Notice of Reasons for Rejection, dated Aug. 23, 2022, for Japanese Application No. 2020-540288, (9 pages) (with English translation).
Oppo, "Resource allocation for PUCCH," R1-1718047, Agenda Item: 7.3.2.4, 3GPP TSG RAN WG1 Meeting 90bis, Prague, CZ, Oct. 9-13, 2017. (7 pages).

* cited by examiner

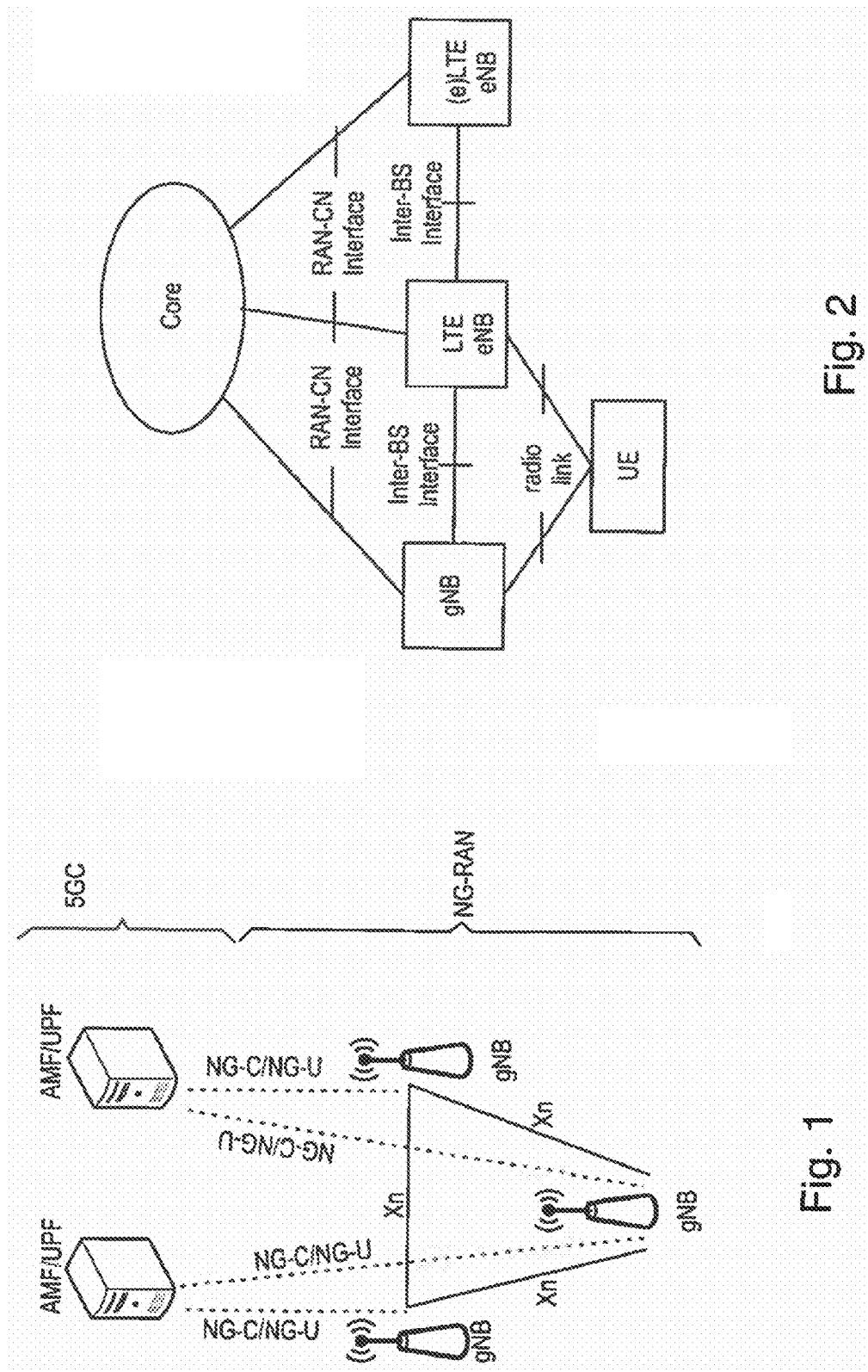

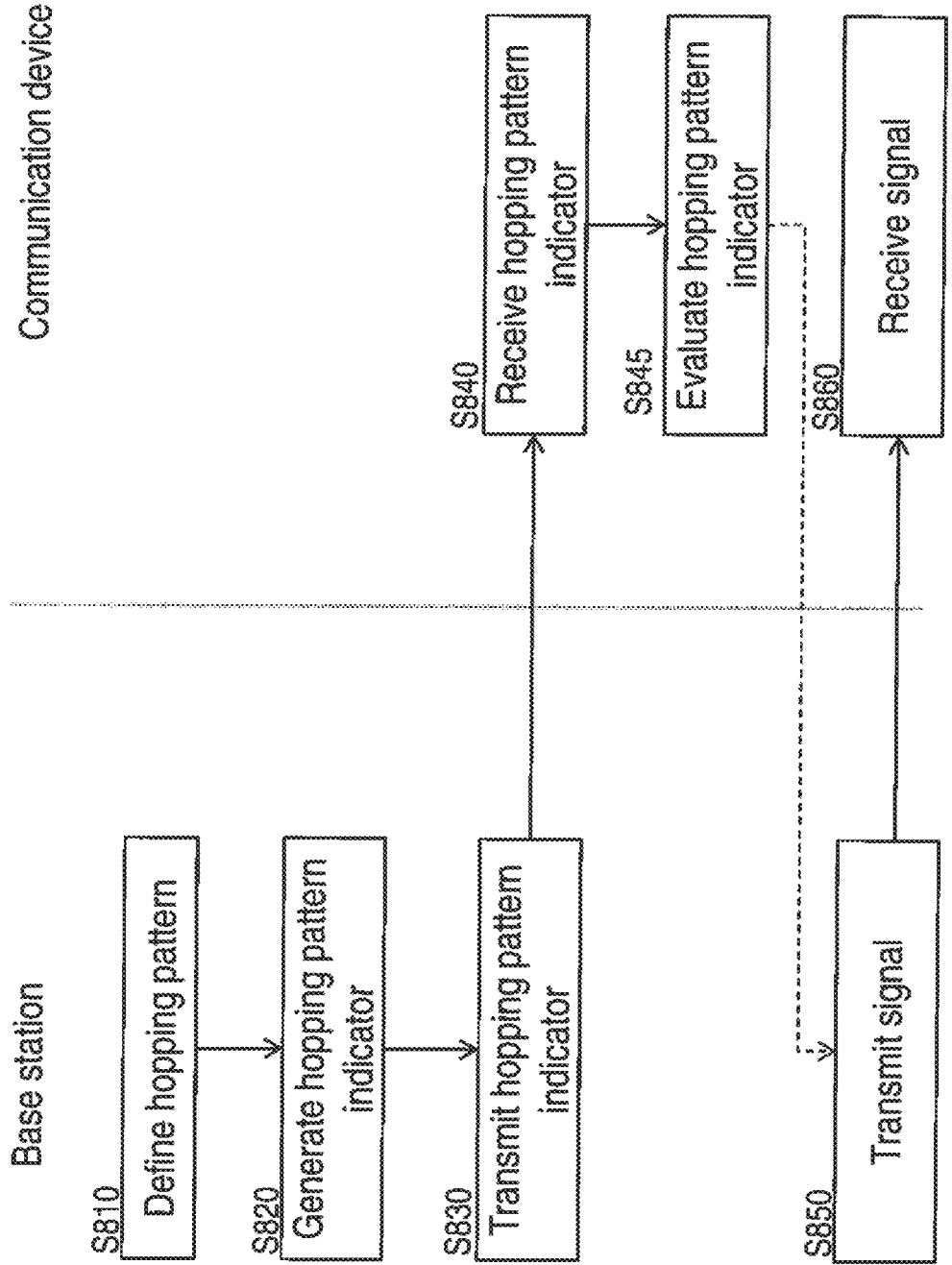

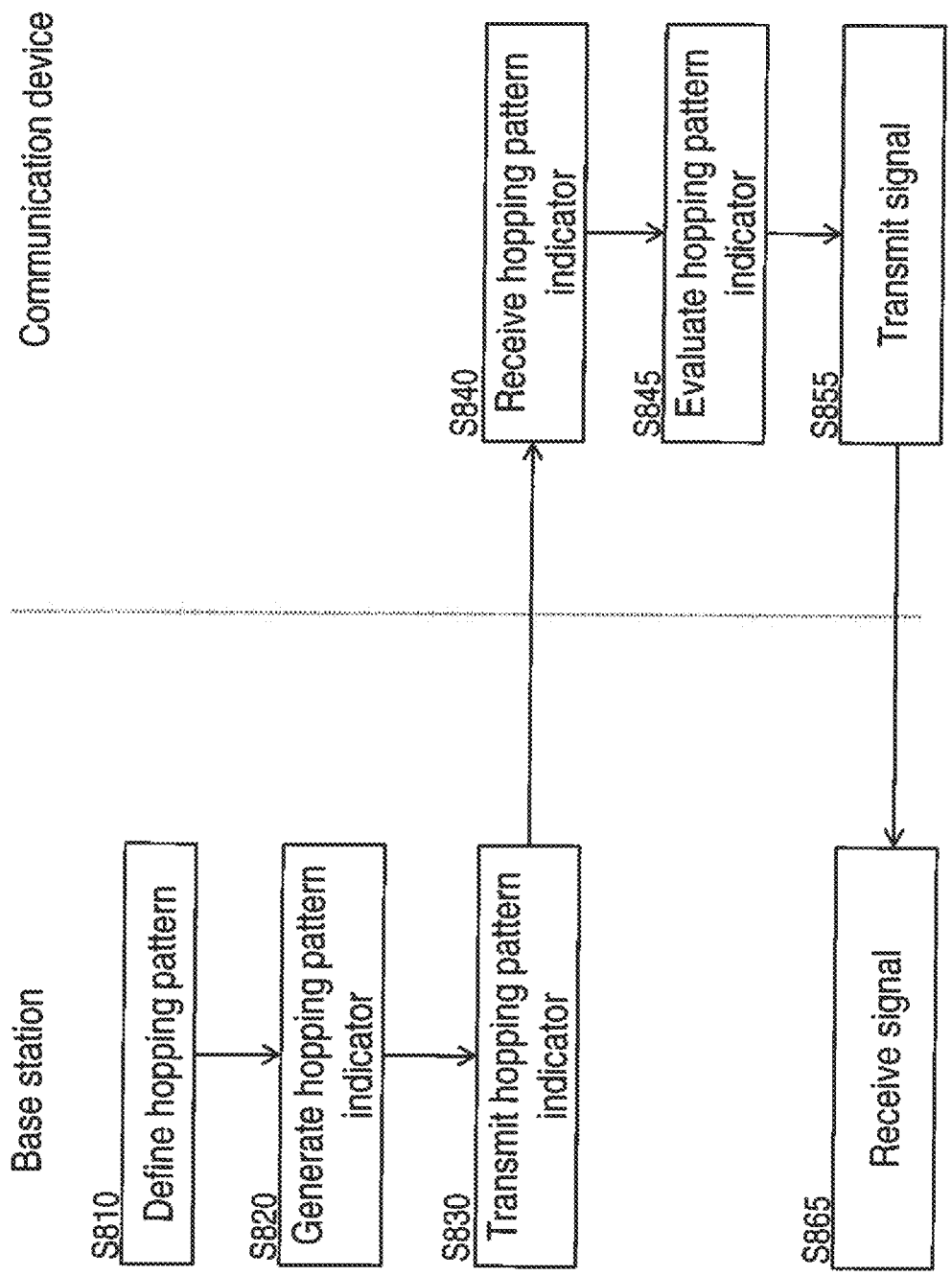

DEVICE SYSTEM AND METHOD FOR NEW RADIO (NR) COMMUNICATION

BACKGROUND

Technical Field

The present disclosure relates to transmission and reception, devices and methods in communication systems, such as 3GPP (3$^{rd}$ Generation Partnership Project) communication systems.

Description of the Related Art

Currently, the 3$^{rd}$ Generation Partnership Project (3GPP) works at the next release (Release 15) of technical specifications for the next generation cellular technology, which is also called fifth generation (5G). At the 3GPP Technical Specification Group (TSG) Radio Access network (RAN) meeting #71 (Gothenburg, March 2016), the first 5G study item, "Study on New Radio Access Technology" involving RAN1, RAN2, RAN3 and RAN4 was approved and is expected to become the Release 15 work item that defines the first 5G standard. The aim of the study item is to develop a "New Radio (NR)" access technology (RAT), which operates in frequency ranges up to 100 GHz and supports a broad range of use cases, as defined during the RAN requirements study (see e.g., 3GPP TR 38.913 "Study on Scenarios and Requirements for Next Generation Access Technologies", current version 14.3.0 available at www.3gpp.org).

The IMT-1010 (International Mobile Telecommunications-2020) specifications by the International Telecommunication Union broadly classified three major scenarios for next generation of mobile communications: enhanced Mobile Broadband (eMBB), massive Machine-type Communications (mMTC), and Ultra-Reliable and Low-Latency Communications (URLLC). In the work item of 3GPP in Release 15, the recently completed Phase I is mainly focused on eMBB and low-latency communications that is covered by introducing non-slot based scheduling. In Phase II, the reliability aspect of the URLLC will be covered, which will be later followed by mMTC related work. For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks.

BRIEF SUMMARY

One non-limiting and exemplary embodiment facilitates providing reliable signaling in a wireless communication system.

In one embodiment, the techniques disclosed here feature a communication device for receiving or transmitting a signal from/to a base station in a wireless communication system in at least one of a plurality of bandwidth parts, a bandwidth part being formed by at least one physical resource block. The communication device comprises a transceiver which, in operation, receives, from the base station, a hopping pattern indicator specifying a hopping pattern, a hopping pattern being an order of the plurality of bandwidth parts by which the signal is to be received or transmitted in a plurality of transmission time intervals, TTIs. The communication device comprises circuitry which, in operation, evaluates the hopping pattern indicator to determine the hopping pattern. The transceiver, in operation, receives or transmits the signal in the plurality of TTIs according to the hopping pattern.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 1 is a schematic drawing of an exemplary architecture for a 3GPP NR system;

FIG. 2 is a block diagram of an exemplary user and control plane architecture for the LTE eNB, NR gNB, and UE;

FIG. 8A is a flow chart of a method for receiving data and a method for transmitting data on the downlink; and FIG. 8B is a flow chart of a method for transmitting data and a method for receiving data on the uplink;

DETAILED DESCRIPTION

Figure 3:
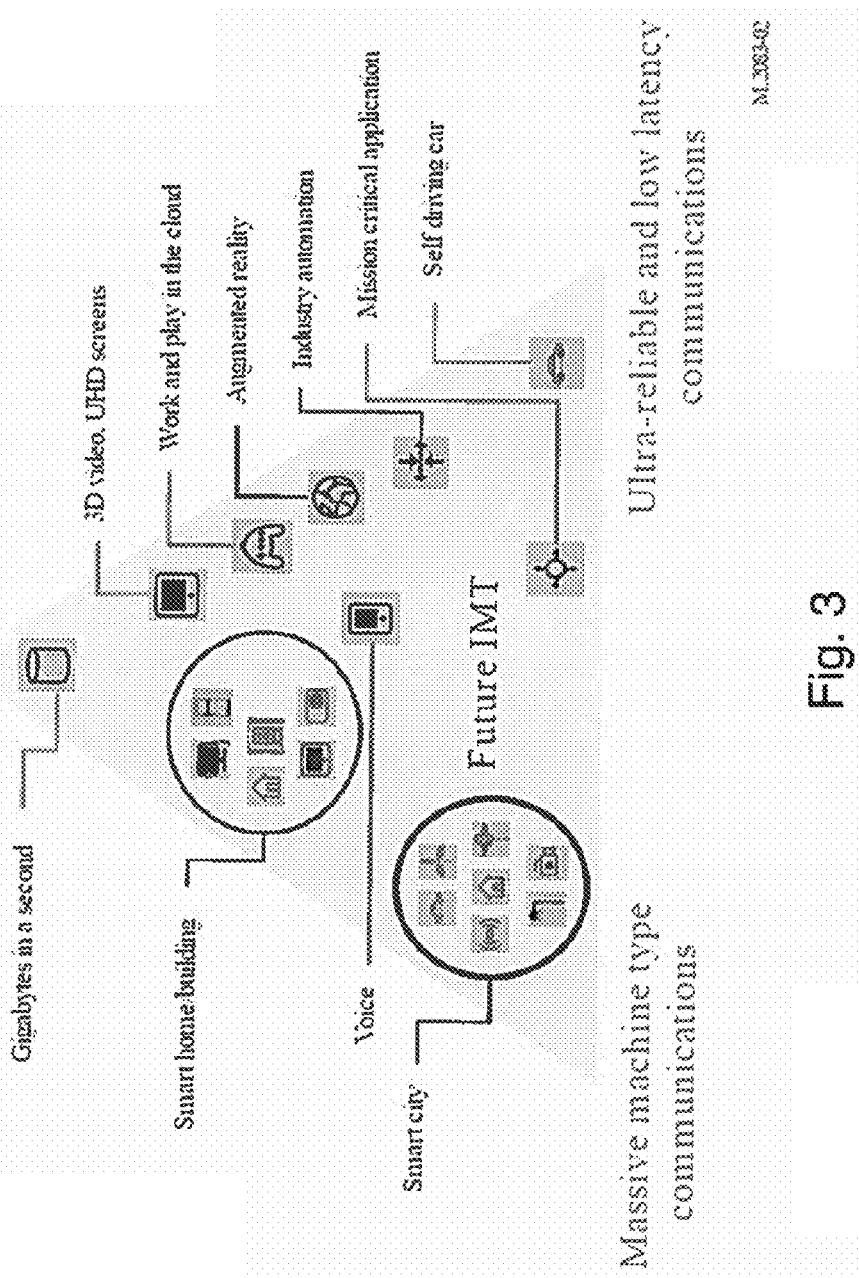
FIG. 3 is a schematic drawing showing usage scenarios of Massive Machine Type Communications (mMTC) and Ultra Reliable and Low Latency Communications (URLLC)

The scope of URLCC with respect to reliability includes specification of CQI (channel Quality Indicator) and MCS (Modulation and Coding Scheme) table designs targeting high reliability. N separate CQI table(s) are supported for URLLC. In particular, the value of N is downselected between 1 and 2. Two target BLERs (Block Error Rate) are supported for URLLC. RRC (Radio Resource Control) signaling is used by the gNB (gNodeB, an exemplary name of the base station in NR corresponding to the eNodeB (enhanced NodeB) of LTE (Long Term Evolution)) to select one of the two target BLER. The configuration of the target BLER or CQI table is part of CSI (Channel State Information) report setting.

Further, if gains are identified, specified: first, definition of a new DCI (downlink control information) format (or new DCI formats) that has a smaller DCI payload size than DCI format 0-0 and DCI format 1-0 unicast data; second, for a given carrier, PDCCH (Physical Downlink Control Channel) repetitions over same or multiple PDCCH monitoring occasion(s) of the same or multiple CORESET (Configuration Resource Set) and search space, and, third, handling of UL (uplink) multiplexing of transmission with different reliability requirements (including the potential need for UL UE (user equipment) pre-emption).

The scope of reliability of URLLC described above is limited. However, the scope becomes wider and other aspects related to reliability are considered in future RAN1 discussions.

As presented in the background section, 3GPP is working at the next release for the ($5^{th}$ generation cellular technology, simply called 5G, including the development of a new radio access technology (NR) operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology". Results and agreements are collected in the Technical Report TR 38.804 v14.0.0.

Among other things, there has been a provisional agreement on the overall system architecture. The NG-RAN (Next Generation—Radio Access Network) comprises gNBs, providing the NG-radio access user plane, SDAP/PDCP/RLC/MAC/PHY (Service Data Adaptation Protocol/Packet Data Convergence Protocol/Radio Link Control/Medium Access Control/Physical) and control plane, RRC (Radio Resource Control) protocol terminations towards the UE. The NG-RAN architecture is illustrated in FIG. 1, based on TS 38.300 v.15.0.0, section 4. The gNBs are interconnected with each other by an Xn interface. The gNBs are also connected by a Next Generation (NG) interface to the NGC (Next Generation Core), more specifically to the AMF (Access and Mobility Management Function) (e.g., a particular core entity performing the AMF) by the NG-C interface and to the UPF (User Plane Function) (e.g., a particular core entity performing the UPF) by the NG-U interface.

Various different deployment scenarios are currently being discussed for being supported, as reflected, e.g., in 3GPP TR 38.801 v14.0.0. For instance, a non-centralized deployment scenario (section 5.2 of TR 38.801; a centralized deployment is illustrated in section 5.4) is presented therein, where base stations supporting the 5G NR can be deployed. FIG. 2 illustrates an exemplary non-centralized deployment scenario and is based on FIG. 5.2.—1 of said TR 38.801, while additionally illustrating an LTE eNB as well as a user equipment (UE) that is connected to both a gNB and an LTE eNB. As mentioned before, the new eNB for NR 5G may be exemplarily called gNB.

As also mentioned above, in $3^{rd}$ generation partnership project new radio (3GPP NR), three use cases are being considered that have been envisaged to support wide variety of services and applications by IMT-2020 (see Recommendation ITU-R M.2083: IMT Vision—"Framework and overall objectives of the future development of IMT for 2020 and beyond", September 2015). The specification for the phase 1 of enhanced mobile-broadband (eMBB) has recently been concluded by 3GPP in December 2017. In addition to further extending the eMBB support, the future work would involve the standardization for ultra-reliable and low-latency communications (URLLC) and massive machine-type communications. FIG. 3 (from the Recommendation ITU-R M.2083) illustrates some examples of envisioned usage scenarios for IMT for 2020 and beyond.

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. In the current WID (work item description) RP-172115, it is agreed to support the ultra-reliability for URLLC by identifying the techniques to meet the requirements set by TR 38.913. The general URLLC requirement for one transmission of a packet is $10^{-5}$ for 32 bytes with a user plane of 1 ms. From RAN1 perspective, reliability can be improved in a number of possible ways. The current scope for improving the reliability is captured in RP-172817 that includes defining of separate CQI tables for URLLC, more compact DCI formats, repetition of PDCCH, etc. However, the scope may widen for achieving ultra-reliability as the NR becomes more stable and developed.

The use case of mMTC is characterized by a very large number of connected devices typically transmitting a relatively low volume of non-delay sensitive data. Devices may be low cost and to have a very long battery life. Utilizing very narrow bandwidth parts is one possible solution to have power saving from UE perspective and enable long battery life in an NR system.

As mentioned above, it is expected that the scope of reliability in NR becomes wider. For example, one requirement to all the cases and especially necessary for URLLC and mMTC is high reliability or ultra-reliability. Several mechanisms can be considered to improve the reliability from radio perspective and network perspective. There are few potential areas that can help improve the reliability. Among these areas are compact control channel information, data/control channel repetition, and diversity with respect to frequency, time and/or the spatial domain. These areas are applicable to reliability, regardless of particular communication scenarios.

In the following discussion, it is proposed to exploit the diversity in frequency and time by utilizing the concept of bandwidth part (BWP) and propose related signaling mechanism in an efficient manner.

In this disclosure, utilization of frequency/time diversity for retransmission/repetition of DL/UL data to improve the reliability in NR is considered. It is proposed to use bandwidth part switching, e.g., for retransmission and repetition of data and control channels, to achieve frequency diversity gains and consequently improve reliability. Especially, when the BWP is narrow, the diversity gains within the BWP could be very limited. In such cases, it can be quite useful to increase the diversity gains by allowing hopping between BWPs.

As defined in the section 4.4.5 of TS 38.211 V15.0.0 (2017-12), a bandwidth part (or carrier bandwidth part) is a contiguous set of physical resource blocks as defined in clause 4.4.4.3, selected from a contiguous subset of the common resource blocks defined in clause 4.4.4.2 for a given numerology on a given carrier.

It is defined in the specification TS 38.211 V15.0.0 that a UE can be configured with up to four carrier bandwidth parts in the downlink with a single downlink carrier bandwidth part being active at a given time. The UE is not expected to receive PDSCH (Physical Downlink Shared Channel), PDCCH (Physical Downlink Control Channel), CSI-RS (Downlink Reference Signals for Estimation of Channel State Information), or TRS (Tracking Reference Signals for fine time and frequency tracking of channel) outside an active bandwidth part.

It is further defined in the specification that a UE can be configured with up to four carrier bandwidth parts in the uplink with a single uplink carrier bandwidth part being active at a given time. If a UE is configured with a supplementary uplink, the UE can in addition be configured with up to four carrier bandwidth parts in the supplementary uplink with a single supplementary uplink carrier bandwidth part being active at a given time. The UE shall not transmit PUSCH or PUCCH outside an active bandwidth part.

A numerology is defined by subcarrier spacing and cyclic prefix (CP). A resource block is generally defined as 12 consecutive subcarriers in the frequency domain. Physical resource blocks (PRB) are numbered within a BWP, the PRB numbering of for the BWP starting from 0.

The size of a BWP can vary from a minimum of 1 PRB to the maximum size of system bandwidth. Currently, up to four BWPs can be configured by higher layer parameters for each DL (downlink) and UL (uplink), with a single active downlink and uplink BWP in a given TTI (transmission time interval). However, the disclosure is not limited to the case defined in TS 38.211 of a UE being configured with up to four bandwidth parts. The number of bandwidth parts may be greater than 4 in the uplink and/or downlink. For example, a UE may be configured with 8 BWPs.

TTI (Transmission Time Interval) determines the timing granularity for scheduling assignment. One TTI is the time interval in which given signals is mapped to the physical layer. The TTI length can vary from 14-symbols (slot-based scheduling) to up to 2-symbols (non-slot based scheduling). Downlink and uplink transmissions are specified to be organized into frames (10 ms duration) consisting of 10 subframes (1 ms duration). In slot-based transmission, a subframe, in return, is divided into slots, the number of slots being defined by the numerology/subcarrier spacing and the specified values range between 10 slots for a subcarrier spacing of 15 kHz to 320 slots for a subcarrier spacing of 240 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.0.0 (2017-12). However, transmission may also be non-slot based. In non slot-based communication, the minimum length of a TTI may be 2 OFDM symbols.

The BWP concept in NR is to allow the dynamic configuration of a relatively small active bandwidth for smaller data packets, which allows power saving for the UE because for a small active BWP the UE needs to monitor less frequencies or use less frequencies for transmission.

In LTE technology, frequency hopping has been used in order to achieve diversity gains and, as a result, to improve coverage and reliability. Frequency hopping is also being discussed as one of the potential way to improve reliability for URLLC. In NR, the frequency hopping within an active BWP is already agreed to be used for PUSCH (Physical Uplink Shared Channel) and PUCCH (Physical Uplink Control Channel). This disclosure proposes ways to further exploit the diversity, and combine with other mechanisms such as repetition and retransmission to improve the overall reliability.

The active bandwidth part for a user equipment (e.g., the bandwidth part to be used by a UE for transmission and reception of signals in a TTI), can be switched among the configured BWPs. For instance, depending on current needs, the active BWP may be switched to a larger BWP, or, in order to save battery power for the UE, to a smaller BWP. This is possible by dynamical indication in the DCI of the active BWP to be used in the next TTI. A DCI transports downlink and uplink scheduling information (e.g., resource assignments and/or grants), requests for aperiodic CQI reports, or uplink power control commands for one cell and one RNTI. DCI coding includes information element multiplexing, CRC (Cyclic Redundancy Check) attachment, channel coding, and rate matching. A DCI carries transmission parameters such as MCS, redundancy version or HARQ process number. A DCI consists of several field (e.g., bit fields/bitmaps) carrying different types of control information or control parameters. The location of a certain parameter, and the number of bits coding the respective parameter are known to the base station transmitting the DCI and the UE receiving the DCI.

However, such switching of the active BWP adds to the latency because the UE needs to decode the DCI and then start hardware tuning to the new active BWP. This increased latency may work against the benefit of diversity since diversity is particularly useful if channel characteristics on different frequencies/BWPs are exploited in a sufficiently small time span in which the channel characteristics do not change significantly. Thus, due to an increase in latency, the gains achieved by diversity might be limited.

It is a proposal of this disclosure to hop between configured BWPs for series of transmissions (e.g., repetitions or retransmissions) in both uplink and downlink, and exploit the frequency diversity by signaling a hopping pattern instead of just one active BWP. By signaling a BWP hopping pattern rather than a single BWP, the latency issue discussed above is addressed. It is further proposed to utilize the existing BWP related bits in the DCI (e.g., the bits currently used for indicating a single active BWP) rather than adding further bits and thereby increasing the DCI overhead. This allows for keeping the DCI compact, which is desirable from a reliability point of view.

Figure 4:
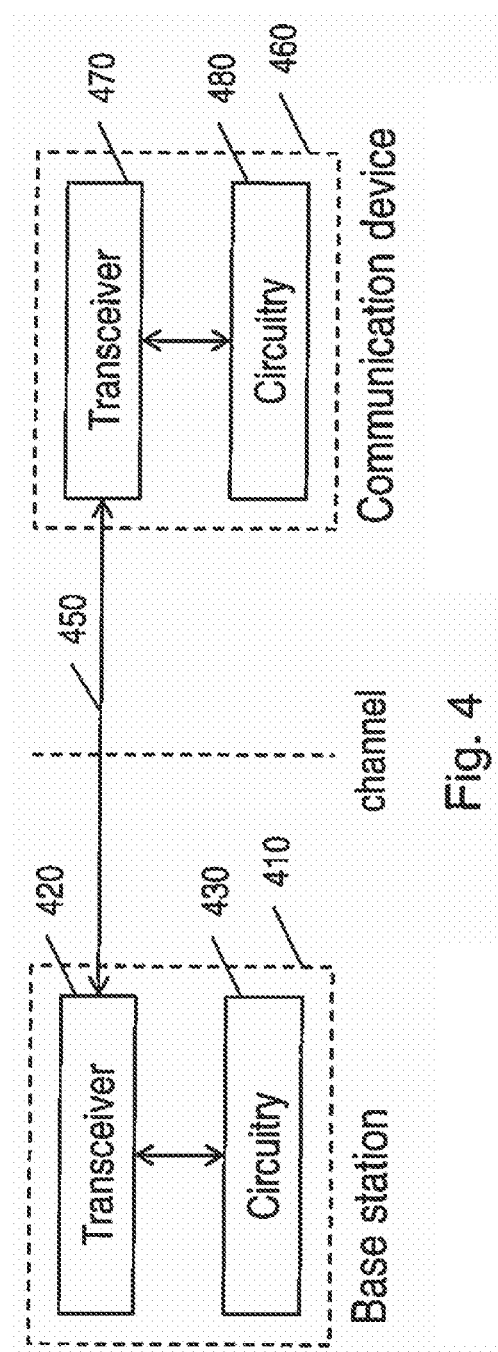
FIG. 4 is a block diagram of a communication device and a base station.

In general, the disclosure provides a communication device 460 for receiving or transmitting a signal from/to a base station 410, and a base station 410 for transmitting or receiving a signal to/from a communication device 460. Communication device 460 and base station 410 are shown in FIG. 4. The disclosure further provides a method for receiving or transmitting a signal from/to a base station to be performed by a communication device, which is illustrated in FIG. 8A, transmitting or receiving a signal to/from a communication device illustrated in FIG. 8B. The apparatuses and methods provided will be described in the following.

In general, the communication device 460 is adapted to receive or transmit a signal in a wireless communication system in at least one of a plurality of bandwidth parts, e.g., the communication device, in operation, receives or transmits a signal (in this disclosure, devices or units included in devices which are adapted to perform a given task are said to, "in operation", perform the given task). Therein, as mentioned above, a bandwidth part is formed by at least one physical resource block. The communication device 460 comprises a transceiver 470 which is adapted to receive, from the base station, a hopping pattern. A hopping pattern is an order of the plurality of bandwidth parts by which the signal is to be received or transmitted in a plurality of transmission time intervals (TTIs). The communication device further comprises circuitry 480 which, in operation, evaluates the hopping pattern indicator to determine the hopping pattern. The transceiver 470, in operation, further receives or transmits the signal in the plurality of TTIs according to the hopping pattern.

The base station 410 is adapted to transmit or receive a signal to/from a communication device 460 in a wireless communication system in at least one of a plurality of bandwidth parts, a bandwidth part being formed by at least one physical resource block. The base station 410 comprises circuitry 430 which, in operation, defines a hopping pattern, a hopping pattern being an order of the plurality of bandwidth parts by which the signal is to be transmitted or received in a plurality of transmission time intervals, TTIs. The circuitry 430 further generates hopping pattern indicator. The base station 410 further comprises a transceiver 420 which, in operation, transmits the hopping pattern indicator to the communication device 460. The transceiver, 420, in operation, further transmits or receives the signal in the plurality of TTIs according to the hopping pattern.

As shown in FIG. 4, base station 410 and communication device 460 communicate in a wireless communication system over a wireless channel 450 (e.g., a radio channel). The wireless communication system may be a communication system in accordance with the technical specifications of 5G, in particular a NR communication system. Accordingly, the base station may be a "gNB" or "gNodeB" corresponding to the eNodeB or its variations ("HeNodeB", "MeNodeB") of LTE. The communication device 460 may be a user device, user equipment (UE), or mobile station, such as a mobile phone/smartphone, a tablet PC, or a laptop computer (the term "UE" or "user equipment" is generally used as an alternative to communication device). Moreover, in particular with respect to the use cases of URLLC; eMBB, and mMTC, the communication device may also be a sensor device, a wearable device, or a connected vehicle, or a controller of an automated machine in an industrial factory. Further, a communication device 460 may be able to function as a relay between base station 410 and another communication device (e.g., the disclosure is not limited to communication "terminals" or user "terminals").

In this disclosure, the term "transceiver" is used for hardware and software components that allow the communication device 460, or, respectively base station 410 to transmit and/or receive radio signals over a wireless channel 450. Accordingly, a transceiver corresponds to a receiver, a transmitter, or a combination of receiver and transmitter. Typically, a base station and a communication device are assumed to be capable of transmitting as well as receiving radio signals. However, particularly with respect to some applications of eMBB, mMTC and URLLC depicted in FIG. 3 (smart home, smart city, industry automation, etc.), cases are conceivable in which a device, such as a sensor, only receives signals. Moreover, the term "circuitry" includes processing circuitry formed by one or more processors or processing units, etc.

This disclosure is applicable to both uplink and downlink signaling. On the one hand, in the downlink case, the base station 410 transmits a signal to the communication device, which the communication device 460 receives. Accordingly, the hopping pattern for downlink signaling is an order of the bandwidth parts by which the base station 410 transmits and, respectively, the communication device 460 receives the signal in subsequent TTIs. On the other hand, in the uplink case, the communication device 460 transmits a signal which the base station 410 receives. Accordingly, the hopping pattern for uplink signaling is an order of the bandwidth parts by which the communication device 460 transmits and the base station 410 receives the signal in subsequent TTIs.

A hopping pattern is an order, e.g., a temporal order or sequence, of bandwidth parts on which a signal is transmitted and, respectively, received over a series of TTIs. The signal comprises plural transmissions, such as repetitions or retransmissions of data or control information (repetitions and retransmissions which will be explained below in more detail). Accordingly, a hopping pattern assigns (maps) each of the plural TTIs in which the signal is transmitted/received to one of the BWPs which are configured for the respective user device and the respective link (e.g., uplink or downlink). In other words, a BWP hopping pattern is a mapping between BWPs and TTIs, a BWP of a plurality of BWPs being mapped to a one of plural TTIs. From a previous TTI to a next/subsequent TTI to which BWPs are assigned by the BWP hopping pattern, the active BWP is switched from the previous BWP to the next TTI. Subsequent TTIs in which the signal is transmitted according to the BWP hopping pattern need not be temporally consecutive, e.g., the TTIs of a BWP hopping pattern, e.g., the TTIs to which BWPs are mapped by the hopping pattern, need not be adjacent (e.g., consecutive) TTIs in the time domain.

It has been mentioned that frequency hopping within an active BWP may be used for PUSCH and/or PUCCH. Accordingly, within a BWP, frequency hopping maybe applied on PRB scale across symbols within a given TTI, e.g., when applying frequency hopping on a PRB scale, a hopping pattern may define a mapping between parts of a PRB and symbols or symbol groups within the TTI. For example, if there is a 7-symbol TTI, then the first four symbols of the TTI can have PUSCH and/or PUCCH in the first half of the PRBs and the last three symbols of the TTI can have PUSCH and/or PUSCH in the second half of the PRBs within an active BWP. However, the BWP hopping described in this disclosure may be performed alternatively or in addition to the frequency hopping.

Figure 5:
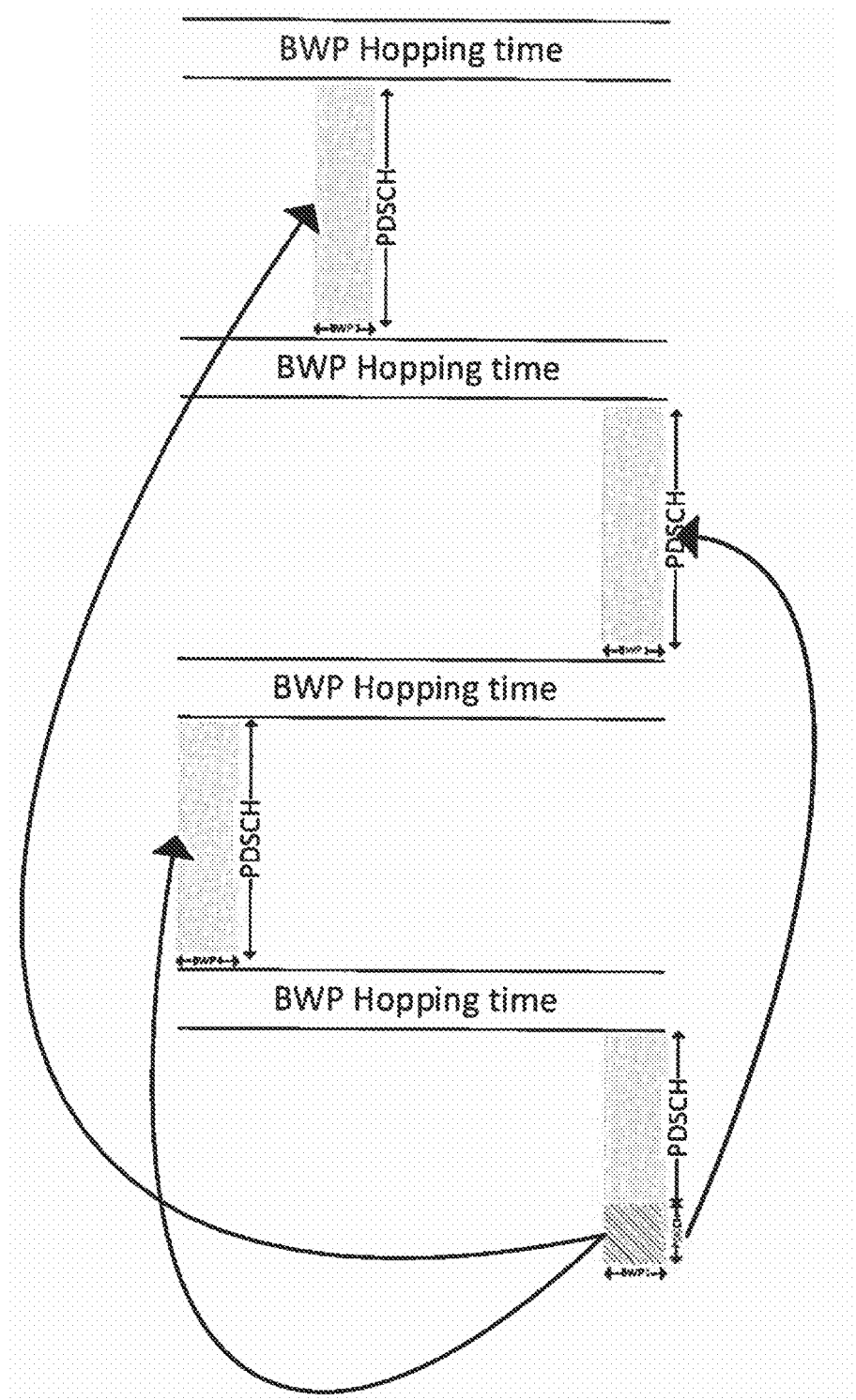
FIG. 5 is a schematic drawing of a bandwidth part hopping pattern for a repetition

An example of a hopping pattern for downlink signaling is illustrated in FIG. 5, where the hopping pattern assigns a transmission of a signal in four subsequent TTIs to respective bandwidth parts. It is assumed that four BWPs (denoted BWP1, BWP2, BWP3, BWP4) are configured for the communication device which transmits or receives the signal. In the first of the four TTIs, the transmission is made in BWP1, in the TTI, the transmission is made in BWP4, in the third TTI, the transmission is made in BWP1 again, and in the fourth of the TTIs, BWP3 is used. The hopping pattern is specified by a hopping pattern indicator. As shown in the figure, the hopping pattern indicator is transmitted, for example, in the first of the four TTIs. In particular, in the first TTI, the signal includes both PDCCH and PDSCH, and the hopping pattern indicator is included in the PDCCH (e.g., the PDCCH is included in the temporally first two OFDM symbols of the TTI, followed by the PDSCH in the remaining symbols). In particular, in the example shown, the hopping pattern indicator is included in a DCI carried by the PDCCH. In the figure, this is symbolized by arrows pointing at the BWPs respectively used in the subsequent TTIs. The communication device knows the bandwidth parts on which it receives the signal in the respective TTIs from the first TTI. Accordingly, no BWP indication is required in the TTIs following the first TTI. Therefore, in the remaining TTIs, PDSCHs are respectively transmitted, but no PDCCH.

As shown in FIG. 5, there is a BWP hopping time (or BWP switching time) between two subsequent TTIs. Such a hopping time is not present in LTE systems. However, a hopping time is required for the recalibration of the communication device (e.g., the hardware such as filters and oscillators) to another BWP. For example, if the bandwidth is 100 MHz, and the BWP to or from which the communication device is switched, the hopping time or switching time may be one or a few hundred microseconds. Depending, for example, on the resolution of the filters, different communication devices/user equipments may allow for different hopping/switching times. Accordingly, a base station may define the hopping time in dependent on the communication devices which are currently registered in the cell which is served by the base station.

For instance, the hopping pattern indicator can be a bitmap as shown in the following Table 1.

TABLE 1

BWP hopping pattern indicator as 2 bitmap

| Index | Bitmap | BWP hopping pattern |
|---|---|---|
| 0 | 00 | BWP1, BWP4, BWP1, BWP4 |
| 1 | 01 | BWP1, BWP4, BWP2, BWP3 |
| 2 | 10 | BWP1, BWP3, BPW1, BWP4 |
| 3 | 11 | BWP1, BWP3, BWP2, BWP4 |

As can be seen from Table 1, a particular hopping pattern does not need to include all configured BWPs (e.g., the hopping pattern with index 0 does not include BWP2 and BWP3). Also, the same BWP may be mapped to at least two of the plural TTIs (e.g., BWP1 in the hopping patterns with indices 0 and 2). Using a two bit hopping pattern indicator, as shown in Table 1, is beneficial because two bits are also required to indicate a single active BWP out of four active BWPs configured for a communication device, which is specified in 3GPP TS 38.212 V15.0.0 (2017-12) and shown in Table 2 (from TS 38.212, Table 7.3.1.1.2-1). In particular, a BWP indicator as shown in Table 2 is currently specified for DCI format 0_1 used for scheduling of PUSCH (Physical Uplink Shared Channel) in one cell as well as for the DCI format 1_1 used for the scheduling of PDSCH in one cell. As can be seen from the table, a one-bit indicator and a two-bit indicator are specified, depending on the number of configured BWPs (e.g., two or, in possible future specifications, more than two). The bit width of the field may be semi-statically signaled, for instance using the specified higher-layer parameter BandwidthPart-Config (for DCI formats 0_1 and 1_1, see, sections 7.3.1.1.2, and, respectively, 7.3.1.2.2).

TABLE 2

Bandwidth part indicator for active BWP (TS 38.212 V15.0.0 (2017-12))

| Value of BWP indicator field 1 bit | Bandwidth part 2 bits | |
|---|---|---|
| 0 | 00 | First bandwidth part configured by higher layers |
| 1 | 01 | Second bandwidth part configured by higher layers |
| | 10 | Third bandwidth part configured by higher layers |
| | 11 | Fourth bandwidth part configured by higher layers |

Thus, if a hopping pattern indicator is signaled rather than a bandwidth part indicator indicating an active BWP, a BWP hopping pattern can be indicated with the same number of bits as a single active BWP, e.g., no additional bits for BWP signaling are required. Moreover, while hopping pattern provides frequency diversity, an increase in latency due to BWP switching, as discussed above, may be alleviated since hopping pattern decoding needs to be performed by the communication device only in the first TTI.

Because a two bit map hopping pattern indicator cannot express all possible sequences of plural (e.g., two or four) different BWPs being assigned as a hopping pattern to plural TTIs, respectively, a selection of hopping patterns among all possible combinations needs to be made. Advantageously, in order to exploit the frequency diversity, BWPs to be used in two subsequent TTIs should be spaced sufficiently apart from each other, e.g., they should have a sufficiently large bandwidth interval between each other.

Although FIG. 5 illustrates a case of a downlink transmission, the present disclosure is also applicable to using BWP hopping patterns for uplink transmissions. In particular, there may be respective different parts of the frequency spectrum for downlink and uplink transmissions. Moreover, each for each BWP configured for DL there may be a corresponding BWP for uplink transmissions. Accordingly, the same hopping pattern indicator may be used either for a BWP on the downlink or a corresponding hopping pattern on the uplink. Alternatively, the indices denoting BWP hopping patterns may specify different respective orderings of BWPs for uplink and downlink. Furthermore, BWPs configures for DL and BWPs configured for UL may respectively differ with respect to bandwidth or with respect to relative position in the frequency spectrum.

As described above with reference to FIG. 5, the hopping pattern indicator may, for example, be included in the DCI which is signaled via PDCCH. The PDCCH is the physical channel (the set of physical resources) on which the DCI is carried. The DCI is obtained/decoded by a communication device by blind decoding of the physical channel. Accordingly, in some embodiments, the circuitry 430 of the base station, in operation, generates a DCI including the hopping pattern indicator. The transceiver 420 of the base station transmits the DCI including the hopping pattern indicator, which the transceiver 470 of the communication device 460 receives.

As mentioned, reliability of the present disclosure is particularly relevant, for example, in the use case of URLLC. In the following, as an exemplary embodiment, details of a signaling mechanism for URLLC in NR are described. Therein, it is assumed that a DCI includes a field that is related to bandwidth parts in general.

As a first step, a URLLC related DCI can be identified by the RNTI (Radio Network Temporary Identifier). Then, as a next step, the communication device 460 (e.g., the processing circuitry 480) interprets the BWP related field in the DCI. If the communication device 460 (the circuitry 480) determines that the DCI is not a URLLC related DCI, the circuitry 480 interprets the BWP related field as an indicator of an active BWP, as shown in Table 2, e.g., the BWP related field carries a bandwidth part indicator indicating an active BWP on which the signal is to be received or transmitted in at least one TTI. However, if the communication device 460 identifies that the DCI is related to URLLC, the communication device 460 interprets the BWP related bit field differently. In particular, instead of signaling just the active BWP in the next transmission, the BWP related field will be interpreted as signaling a BWP hopping pattern, for example as shown in Table 1 where four BWPs are configured, e.g., the BWP related field carries the hopping pattern indicator.

Although this example refers to a signaling mechanism for URLLC, the described mechanism is not limited to URLLC. Alternatively, the BWP related field can be interpreted as a hopping pattern indicator if some other kind of DCI is identified, e.g., a DCI related to mMTC.

It is a benefit of the exemplary signaling mechanism described above that no additional BWP related signaling will be required, either in the DCI or in higher-layer signaling. However, this mechanism will always require that a BWP hopping pattern (rather than a single active BWP) is applied and signaled in URLLC or in the particular use case of the signaling mechanism.

The present disclosure is not limited to identifying a kind of DCI before interpreting a BWP related bit field (in the DCI or in higher layer signaling) as a BWP indicator. For instance, higher layer-signaling may indicate how a DCI related bit field is to be interpreted by the communication device 460. To provide a greater variability of BWP usage, different variations of the signaling mechanism will be described in the further disclosure.

For instance a BWP hopping pattern can be applied to both PDCCH and PDSCH transmissions. The BWP hopping pattern can further be the same for PDCCH and PDSCH (for instance, if the signal includes, in each of the TTIs over which the hopping pattern is applied a PDCCH and a PDSCH).

In some embodiments, a new bit field is added in the higher layer signaling specifically to indicate if BWP hopping is applied or not. In particular, a hopping presence indicator is semi-statically signaled in addition to a BWP related field (e.g., a BWP related field in accordance with or similar to BWP related field in the above-described exemplary signaling mechanism). The hopping presence indicator indicates whether or not the signal is to be received or transmitted (by the base station 410 and communication device 460, depending on whether the signal is an uplink or downlink signal) in accordance with the hopping pattern. The hopping pattern indicator is signaled semi-statically in higher-layer signaling, in particular, in RRC (Radio Resource Control) signaling as defined, for instance, in the protocol specification 3GPP TS 38.331 V0.0.1 (2017-03).

For instance, the hopping presence indicator may be signaled as a one-bit field in the RRC. A value "1" indicates that the signal is to be transmitted or received (UL or DL) in accordance with the hopping pattern, e.g., in the case of a value "1", the field in the DCI carries the hopping pattern indicator, as for example, shown in Table 1. A value "0" indicates that the signal is not to be transmitted or received in accordance with the hopping pattern. In accordance with a value "0", the BWP related field carries a BWP indicator (as shown in Table 2) indicating an active BWP on which the signal is to be received or transmitted in at least one TTI (of course, the values of "0" and "1" are only examples, in particular, they are interchangeable). Accordingly, dependent on the value of the hopping presence indicator, the circuitry 480 of the communication device 460 interprets the BWP related bit field either as the hopping pattern indicator or as a BWP indicator.

For example, the BWP related field may be included in a DCI. Accordingly, the circuitry 430 base station 410 generates a DCI including the field, and transceiver 420 of the base station 410 transmits the DCI to the communication device 460. The transceiver 470 of the communication device 460 receives the DCI including the field, and the circuitry 480 evaluates/interprets the field. If the circuitry 480 determines that the signal is to be received or transmitted in accordance with the hopping pattern (hopping presence indicator value "1"), the field carries the hopping pattern indicator, and the base station receives or transmits the signal in accordance with the hopping pattern. Else, if the circuitry determines that the signal is to not to be received or transmitted in accordance with the hopping pattern, the field in the DCI carries a BWP indicator.

In the latter example, the hopping presence indicator in the higher layer signaling indicates whether or not BWP hopping in accordance with a BWP hopping pattern is applied, and the specific hopping pattern is indicated via DCI. With respect to the URLLC signaling mechanism described above. This provides the benefit that BWP hopping does not need to be applied for every transmitted and received signal, because a BWP hopping is only applied when the presence of BWP hopping is configured by the higher layer, e.g., when BWP hopping is switched on by means of the hopping presence indicator. Moreover, with respect to the URLLC, mechanism, the latter example is not limited to a particular use case such as URLLC, and can therefore be applied to other scenarios. This is because the circuitry 480 of the communication device determines on the basis of the hopping presence indicator whether or not a BWP related field in the DCI is to be interpreted as a hopping pattern indicator or as a BWP indicator, e.g., the same DCI type/format can be used for both BWP hopping and simple switching of an active BWP.

In some other exemplary embodiments, rather than signaling the BWP hopping pattern indicator in the DCI, all BWP hopping pattern related signaling is configured semi-statically by higher layers. This means that the hoping pattern indicator is signaled semi-statically as well. The circuitry 480 of the communication device 460, in operation, evaluates the hopping presence indicator to determine whether or not the hopping pattern indicator is signaled. Accordingly, the hopping patter indicator is semi-statically signaled in the RRC signaling. For instance, the BWP hopping related bits in the RRC are ordered in such a way that a bit field carrying the hopping presence indicator is followed by bit fields carrying the hopping pattern indicator. However, if the hopping presence indicator indicates that the hopping pattern indicator is not signaled, e.g., that the signal is not to be received or transmitted in accordance with a hopping pattern, the hopping pattern indicator is not included in the higher-layer signaling.

For instance, if the hopping pattern is not signaled, no other BWP related bits are included in the RRC signaling, and the bits following the hopping presence indicator carry control information which is not related to BWP hopping (in this case, the RRC signaling may contain less bits if no hopping pattern is signaled). Moreover, even if no hopping patter is signaled, neither in RRC signaling nor in the DCI, a BWP indicator can still be signaled in the DCI, e.g., switching of an active BWP from one configured BWP to another configured BWP may still be possible. Alternatively, if no BWP hopping pattern indicator is signaled and BWP switching apart from BWP hopping is not desired, any BWP related bits in the DCI may be omitted, and, accordingly, a shorter DCI is transmitted by the base station 410 and received by the communication device. A short DCI may be beneficial for the reliability of the DCI transmission. This is because if fewer bits are included in the DCI, a lower coding rate can be used for coding/decoding the DCI if the size of the control channel (PDCCH) is fixed.

Semi-statically signaling the BWP hopping pattern provides the benefit that an increased number of BWP hopping patterns can be applied. Since the hopping pattern indicator is not transmitted/received in the DCI, the latency in decoding the DCI is not affected. Accordingly, the size of the hopping pattern indicator may be handled in a less restrictive way, and more bits included in the bitmap may be used to provide indications of more hopping patterns. As a further alternative, a hopping pattern indicator may be divided among the higher layer signaling and the DCI, e.g., one or more bits in the higher-layer signaling indicate a group of hopping patterns from among configured groups, and one or two bits in the DCI indicate a hopping pattern from among the group indicated by the higher-layer signaling.

According to some further exemplary embodiments, the hopping pattern indicator is included in the DCI. The transceiver 470 of the communication device 460, in operation, receives the DCI, and the circuitry 480 of the communication device 460 determines, by evaluating the length of the DCI. For instance, the length of the DCI may depend on the number of BWP related bits. For instance, if no BWP related bits are present neither switching of an active BWP nor BWP hopping is applied. Two BWP related bits indicate that a hopping pattern is to be applied for the transmission/reception of the signal, and the value of the two bits indicates the particular pattern to be used. Furthermore, the interpretation of the two bits may again be dependent on higher-layer signaling, as discussed above, and the bits may be interpreted either as a hopping pattern indicator or as a BWP indicator. Alternatively, the number of BWP related bits may vary between 0, 1, and 2, wherein the presence of indicates that a BWP hopping pattern indicator is transmitted in these two bits, and the presence of one bit indicates that switching of a BWP between two configured BWPs is indicated by the one bit.

If a signal is transmitted by the base station 410 is to be received by the communication device 460 in a plurality of subsequent TTIs in accordance with a hopping pattern, and the hopping pattern indicator is included in a DCI signaled via PDCCH in the initial TTI of the plurality of subsequent TTIs (e.g., the first of the plural TTIs in temporal order), it needs to be known to the communication device 460 by the starting time of the initial TTI on which BWP the signal including the hopping pattern indicator is to be received. To this end, in some exemplary embodiments, the base station 410 generates and transmits an initial bandwidth part indicator specifying a bandwidth part on which the signal is to be received or transmitted in the initial TTI. The transceiver of the communication device 460 receives the initial BWP indicator transmitted by the base station 410, and the circuitry 480 of the communication device 460 evaluates the initial bandwidth part indicator to determine the bandwidth part on which the signal is to be received in the initial TTI. The transceiver 470, in operation, further receives or transmits the signal in the plurality of TTIs, wherein, in the initial TTI, the signal is received or transmitted as specified by the initial BWP indicator. However, in order to avoid additional signaling to indicate a BWP for a transmission in the initial BWP, BWP hopping patterns can be selected all of which assign the same BWP to the initial TTI (for example, all hopping patterns in Table 1 begin with "BWP1").

As mentioned, in some embodiments, the signal transmitted/received, either on the uplink or on the downlink, is a series (e.g., sequence) of repetitions or retransmissions, e.g., in the plurality of TTIs, the same original information (e.g., data or control information) is transmitted in plural transmissions, either by repeating the same (e.g., identical) information in the respective transmissions, or by transmitting different versions (e.g., redundancy versions) of the data or information.

In particular, on the one hand the term "repetition" refers to repeatedly transmitting the same original information, and retransmission refers to transmitting different versions of the original data or control information, e.g., copies of the same information. Generally, repetitions are transmitted unrequested. That is, the information is repeated a predetermined number of times in different TTIs, and it is not known at the transmitter side when (e.g., in which TTI) the information is successfully decoded at the receiver side (the terms transmitter side and receiver side are used to denote the transmitting or receiving entity of a particular transmission and refer to base station and communication device, respectively, dependent on the direction (uplink/downlink)).

The case of repetition is shown in FIG. 5 in an example of a downlink transmission. It can be seen that in the initial TTI, a PDCCH is transmitted advancing the PDSCH. This initial PDCCH schedules the complete series of retransmissions, e.g., the first transmission in the initial TTI and the subsequent repetitions in the subsequent TTIs. Moreover, the BWP hopping pattern is signaled via the DCI which is included in the initial PDCCH. Apart from this initial PDCCH, the bandwidth pattern used for the series of repetitions including the initial transmission cannot be switched.

On the other hand, the term "retransmission" refers to a series of transmissions of different redundancy versions, the different redundancy versions obtained by means of Forward Error Coding (FEC). Retransmissions may be handled using HARQ (Hybrid Automatic Repeat Request). Retransmissions may be transmitted upon request, e.g., after receiving, a transmission and judging whether the data has been decoded successfully, the receiving side replies by sending back a (positive) acknowledgement (ACK) if it was able to decode the information or, else a negative acknowledgement (NACK) if it was unable to decode the information. In the case of an ACK, no retransmissions are required and sent, and in the case of a NACK, a retransmission of another redundancy version is transmitted in response to the NACK. However, retransmissions are not necessarily associated with a feedback mechanism such as HARQ. HARQ-less retransmissions, e.g., retransmissions without ACK/NACK signaling, may also be used.

As mentioned, according to this disclosure, the TTIs of a BWP hopping pattern, e.g., the TTIs to which BWPs are mapped by the hopping pattern, need not be adjacent TTIs in the time domain. For instance, if the signal transmitted/received in accordance with the hopping pattern is HARQ process wherein the receiver side (base station 410 in UL or the communication device 460 in DL) signals an ACK or NACK, the ACK/NACK may be a predefined number of TTIs (e.g., a number known to both transmitter side and receiver side) after the initial or previous transmission of the signal. Accordingly, in case of a NACK, the next retransmission is signaled the predetermined number of TTIs (or another predetermined number both known to receiver side and transmitter side) after signaling of the NACK.

Figure 6:
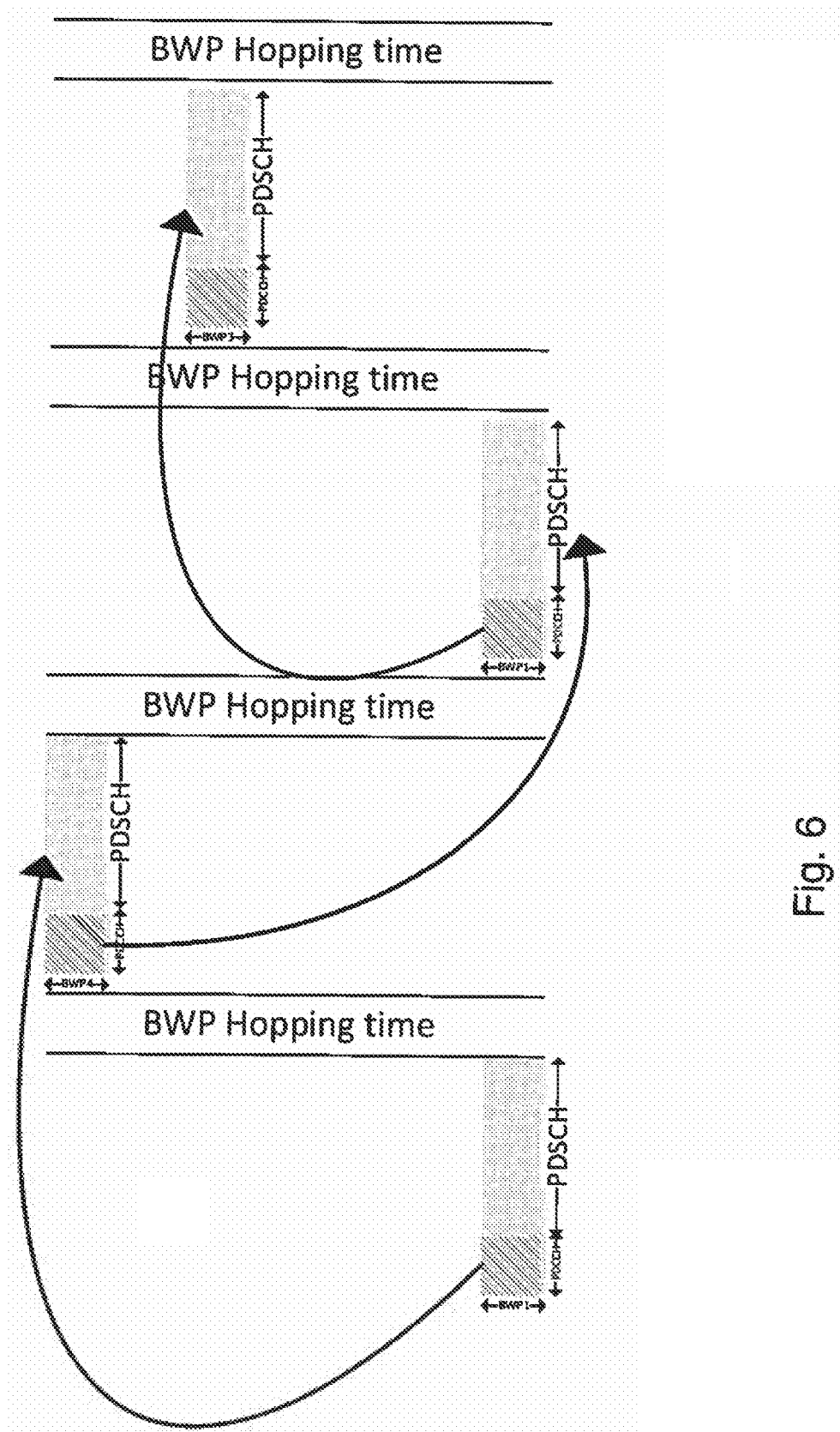
FIG. 6 is a schematic drawing of a bandwidth part hopping pattern for a retransmission

The case of retransmission is shown in FIG. 6. Therein, in each of the TTIs used for the initial transmission and retransmissions, both PDCCH and PDSCH are transmitted. The PDCCH schedules the next respective retransmission in the next of the plurality of TTIs. However, a BWP hopping pattern is signaled only in the initial PDCCH in the first one of the TTIs. Accordingly, no BWP related bits are required in the DCIs in the PDCCHs in the subsequent TTIs.

Furthermore, the present disclosure is not limited to using a single hopping pattern and signaling a single hopping pattern indicator. In some exemplary embodiments, at least two hopping pattern indicators are signaled. Accordingly, the circuitry 430 of the base station 410, in operation, generates a first hopping pattern indicator indicating a first hopping pattern for a first signal and a second hopping pattern indicator indicating a second hopping pattern for a second signal. The transceiver 420 of the base station, in operation, 410 transmits the first hopping pattern indicator and the second hopping pattern indicator to the communication device 460, where they are received by the transceiver 470. The circuitry 480 of the communication device 460, in operation, in addition to evaluating the first hopping pattern indicator, evaluates the second hopping pattern indicator to determine the second hopping pattern. The transceiver 470 receives (DL) or transmits (UL) the first signal according to the first hopping pattern, and receives or transmits the second signal according to the second hopping pattern.

The above described embodiments regarding signaling of the hopping pattern indicator and regarding the transmission/reception of the signal according to a hopping pattern may be applied to the first hopping pattern and the second hopping pattern individually. The second hopping pattern is different from the first hopping pattern, e.g., with respect to the BWPs and/or with respect to the TTIs. For example, the order of BWPs (e.g., the temporal sequence by which the BWPs are mapped to TTIs) in the first hopping pattern may be different from the order of BWPs in the second hopping pattern. Moreover at least one of the BWPs to which TTIs are mapped in the second hopping pattern may be different from the bandwidth parts to which TTIs are mapped by the first hopping pattern. Also, the first hopping pattern may refer to different TTIs than the second TTI, either partially or completely. Furthermore, although the two hopping patterns may specify the same link/direction (uplink or downlink), the first hopping pattern may as well specify a downlink transmission and the second hopping pattern an uplink transmission.

Also, the first hopping pattern indicator and the second hopping pattern indicator may be signaled on different levels. For instance, the first hopping pattern indicator may be signaled semi-statically, and the second hopping pattern indicator may be signaled in a DCI. Alternatively, both hopping patterns are signaled semi-statically, or both hopping pattern indicators are signaled in respective DCIs.

Moreover, the first hopping pattern and the second hopping pattern may relate respectively to different types of signals. In particular, for instance, first signal may be data, and the second hopping pattern may be control information, e.g., the first hopping pattern specifies a series of PDSCH transmissions, and the second hopping pattern specifies a series of PDCCH transmissions. In this disclosure, "signal" is a generic term covers both data and control information. The term "data" is used to refer to data such as user data (including headers from layers higher than PHY) which is also referred to as "payload".

In some particular examples, the control information which is signaled according to the second hopping pattern includes the first hopping pattern indicator, e.g., the control information specifies the first hopping pattern specifying data signaling. In particular, the control information may include repetitions or retransmissions of the first hopping pattern indicator.

Figure 7:
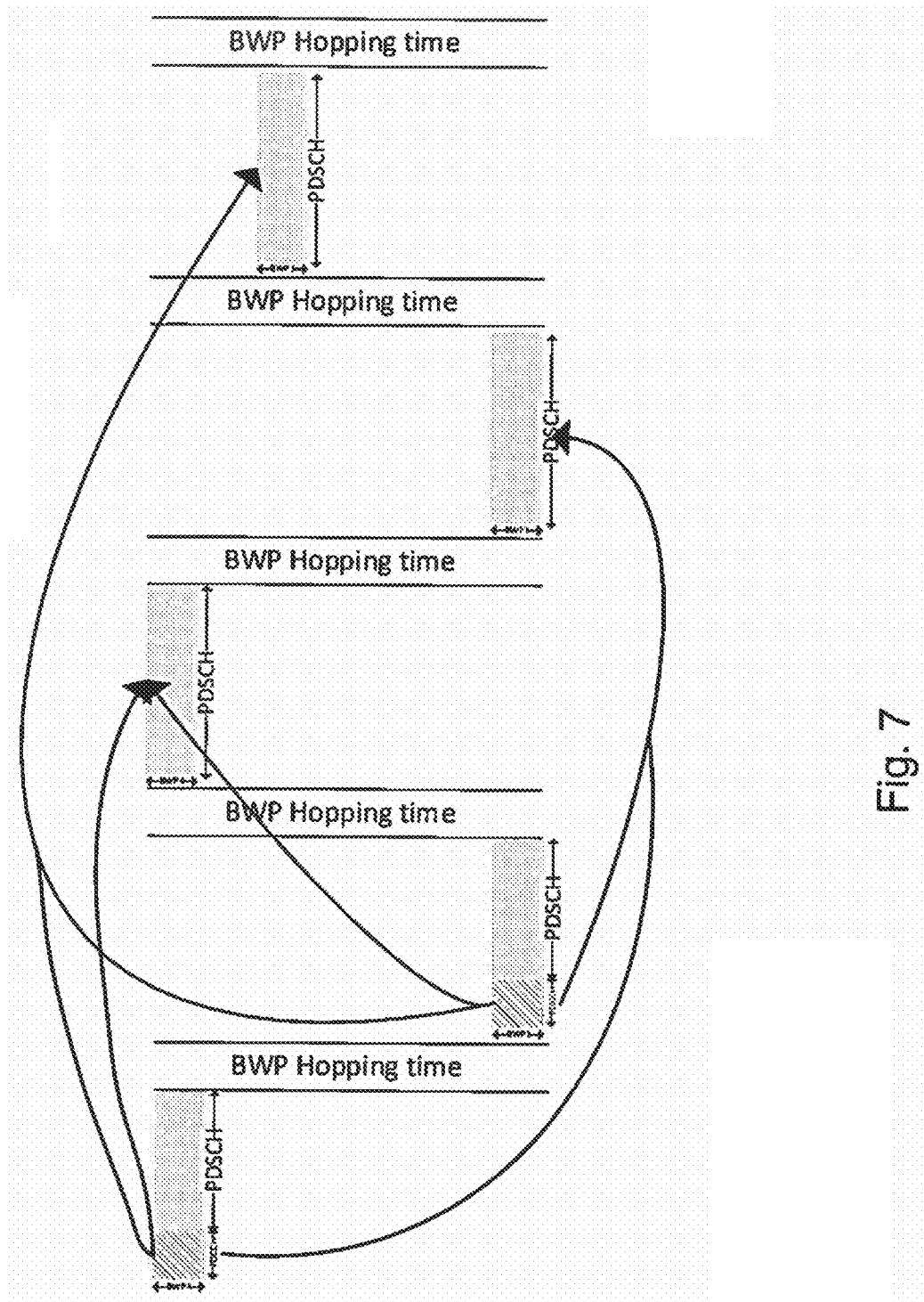
FIG. 7 is a schematic drawing of a bandwidth part hopping pattern signaled in plural DCIs (downlink control information)

An example is shown in FIG. 7 in which the second hopping pattern specifies repetitions (e.g., an initial transmission and at least one retransmission) of the first hopping pattern. The first hopping pattern specifies an order of a data signal signaled on the PDSCH (in the figure, the second hopping pattern, BWP1->BWP4->BWP1->BWP3 begins with the second leftmost TTI shown). The hopping pattern for the PDSCH signal is included in DCIs signaled in the PDCCH in the leftmost and second leftmost TTI shown in the figure, e.g., the hopping pattern is transmitted in an initial transmission of PDCCH in an initial TTI and is repeated or retransmitted (repetition of the bits forming the hopping pattern indicator or of the complete PDCCH) in a subsequent TTI using a hopping pattern BWP4->BWP1. The BWP hopping pattern for the initial transmission of PDCCH and its repetition(s) is semi-statically configured by higher layers and the BWP hopping pattern for PDSCH retransmission or repetition is dynamically signaled by the DCI in the initial PDCCH. The BWP hopping pattern (BWP4->BWP1) between the initial PDCCH transmission and retransmission is semi-statically configured. These PDCCH are combined, if necessary (e.g., HARQ combined) and signal the BWP hopping pattern via DCI for next PDSCH transmissions and corresponding repetitions (or retransmissions). Such combined use of different hopping patterns may be beneficial as the reliability is enhanced with respect to different channels such as a control channel and a data channel.

In the example described above with reference to FIG. 7, two hopping patterns are specified for two processes which are interrelated with each other (e.g., data signaling and control signaling of control information associated with the data signaling). However, two or hopping patterns may also define processes of the same communication device that are independent of each other, such as different HARQ processes signals signaled on the PDSCH. In particular, a first signal may be transmitted/received in accordance with a first BWP hopping pattern and a second signal may be received in accordance with a second hopping pattern, as described above. The first signal and the second signal may be respective sequences of retransmissions or repetitions. The first signal and the second signal may both be retransmissions, or the first and the second signal may both be repetitions, or alternatively, one signal may be a series of repetitions and the other one a series of repetitions.

Although some of the above embodiments relate to URLLC and/or to retransmissions or repetitions, the present disclosure is not limited thereto, and the proposed techniques are applicable to possible future cases as well. Some of these use cases may be related to mMTC. Machine communication may require configuration of very narrow bandwidth parts and highly energy efficient devices. In such use cases the application of BWP hopping patterns would be particularly beneficial.

Moreover, a hopping pattern may comprise different BWPs having respectively different bandwidths. For instance, for the initial transmission of the signal, a BWP with a wider bandwidth may be used than the bandwidth(s) of the BWP(s) used for the subsequent transmissions. This may facilitate reducing the number of required repetitions or retransmissions in processes such as HARQ processes. On the other hand the narrower BWPs may also be used for the more previous transmissions, in order to require a larger bandwidth for a process only in the case that several retransmissions or repetitions are needed. Moreover, multiple communication processes, possibly including different communication types and/or plural communication devices may be performed using a single BWP within a TTI. BWP hopping may be used to facilitate load balancing between different communication processes.

According to current NR specifications, a single active BWP is configured for a communication device. However, future releases of NR specifications may allow for plural active BWPs. Accordingly, if additional bits are already defined for BWP signaling, this also widens possibilities to use these bits for the signaling of BWP hopping without generating additional overhead due to the BWP hopping patterns.

As mentioned, in some exemplary embodiments, different hopping patterns may be applied to different channels, such as data channel (PDSCH) and control channel (PDCCH). This application of different hopping patterns is not limited to the case shown in FIG. 7 where, in the second TTI from the left, the same BWP carries both the PDCCH signal and the PDSCH signal. If multiple active BWPs are configured, the communication processes on the different channels may also be mapped onto respectively different BWPs in the same TTI. Moreover, multiple HARQ processes (possible belonging to the same channel) may apply different hopping patterns using different BWPs within one or plural TTIs.

Corresponding to the above described base station and transmitter and their embodiments are method for a base station and a method for a communication device. The methods are illustrated in FIG. 8A for a downlink transmission and in FIG. 8B for an uplink transmission.

The method for transmitting (downlink) or receiving (uplink) a signal to/from a communication device in a wireless communication system in at least one of a plurality of BWPs is shown in FIG. 8A (downlink) and FIG. 8B (uplink) respectively on the left-hand side and includes the following steps to be performed by a base station. In step S810, a hopping pattern is defined. In step S820, a hopping pattern indicator specifying the hopping pattern is generated. In step S830, the hopping pattern indicator is transmitted to the communication device. In the downlink method, in step S850, the signal is transmitted to the communication device in accordance with the hopping pattern. In the uplink case, in step S865, the signal transmitted by the communication device is received by the base station.

The method for receiving (downlink) or transmitting (uplink) a hopping pattern from/to a base station in a wireless communication system in at least one of a plurality of bandwidth parts is shown on the right hand side of FIG. 8A (downlink) and, respectively, FIG. 8B. The method includes the following steps to be performed by a communication device. In step S840, a hopping pattern indicator (which has been transmitted by the base station in step S830 and) which specifies a hopping pattern is received. Then, in step S845, the hopping pattern indicator is evaluated to determine the hopping pattern according to which a signal is to be received (downlink) or transmitted (uplink). In the downlink method, in step S860, the signal (which is transmitted by the base station in step S850) is received according to the hopping pattern. In the uplink method, in step S855, the signal is transmitted to the base station in accordance with the hopping pattern.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

In an embodiment, the disclosure provides a communication device for receiving or transmitting a signal from/to a base station in a wireless communication system in at least one of a plurality of bandwidth parts, a bandwidth part being formed by at least one physical resource block. The communication device comprises a transceiver which, in operation, receives, from the base station, a hopping pattern indicator specifying a hopping pattern, a hopping pattern being an order of the plurality of bandwidth parts by which the signal is to be received or transmitted in a plurality of transmission time intervals, TTIs. The communication device further includes circuitry which, in operation, evaluates the hopping pattern indicator to determine the hopping pattern. The transceiver, in operation, further receives or transmits the signal in the plurality of TTIs according to the hopping pattern.

For example, the transceiver receives downlink control information, DCI, including the hopping pattern indicator.

In some embodiments, the transceiver, in operation, further receives, from the base station, a hopping presence indicator indicating whether or not the signal is to be received or transmitted in accordance with the hopping pattern, the hopping presence indicator being semi-statically signaled, and the circuitry, in operation, further evaluates the hopping presence indicator to determine whether or not the signal is to be received or transmitted according to the hopping pattern.

For instance, the transceiver, in operation, receives downlink control information, DCI, including a field, and if the circuitry determines that the signal is to be received or transmitted in accordance with the hopping pattern, the field carries the hopping pattern indicator, else if the circuitry determines that the signal is not to be received or transmitted in accordance with the hopping pattern, the field carries a bandwidth part indicator indicating an active bandwidth part on which the signal is to be received or transmitted in least one TTI.

In some embodiments, the transceiver, in operation, receives downlink control information, DCI, including the hopping pattern indicator, and the circuitry, in operation, evaluates the length of the DCI to determine whether or not the hopping pattern indicator is signaled.

In some exemplary embodiments, the hopping pattern indicator is semi-statically signaled, and the circuitry, in operation, evaluates the hopping presence indicator to determine whether or not the hopping pattern indicator is signaled.

In some embodiments, the transceiver, in operation, further receives an initial bandwidth part indicator, the initial bandwidth part indicator being semi-statically signaled and specifying a bandwidth part on which the signal is to be received or transmitted in the initial TTI of the plurality of TTIs. The circuitry, in operation, further evaluates the initial bandwidth part indicator to determine the bandwidth part on which the signal is to be received in the initial TTI. Further, the transceiver, in operation, receives or transmits the signal in the initial TTI in the bandwidth part specified by the initial bandwidth part indicator.

In some exemplary embodiments, the signal received or transmitted in the plurality of TTIs is a sequence of repetitions or retransmissions.

Moreover, in some embodiments, the hopping pattern indicator received from the base station is a first hopping pattern indicator indicating a first hopping pattern for a first signal. The transceiver, in operation, further receives, from the base station, a second hopping pattern indicator specifying a second hopping pattern for a second signal, the second hopping pattern being different from the first hopping pattern. The circuitry, in operation, further evaluates the second hopping pattern indicator to determine the second hopping pattern. The transceiver, in operation, further receives or transmits the second signal according to the second hopping pattern.

For instance, the first signal is data and the second signal is control information.

In some particular examples, the control information (second signal) includes repetitions of the first hopping pattern indicator.

Further, for instance, the first and the second signal are respective sequences of transmissions or retransmissions.

In an embodiment, the disclosure provides a base station for transmitting or receiving a signal to/from a communication device in a wireless communication system in at least one of a plurality of bandwidth parts, a bandwidth part being formed by at least one physical resource block. The base station comprises circuitry which, in operation, defines a hopping pattern, a hopping pattern being an order of the plurality of bandwidth parts by which the signal is to be transmitted or received in a plurality of transmission time intervals, TTIs, and generates a hopping pattern indicator specifying the hopping pattern. The base station further comprises a transceiver which, in operation, transmits the hopping pattern indicator to the communication device and transmits or receives the signal in the plurality of TTIs according to the hopping pattern.

For example, the transceiver transmits downlink control information, DCI, including the hopping pattern indicator.

In some embodiments, the circuitry, in operation, further generates a hopping presence indicator indicating whether or not the signal is to be received or transmitted in accordance with the hopping pattern, and the transceiver, in operation, transmits the hopping presence indicator to the communication device. The hopping presence indicator is semi-statically signaled.

For instance, the transceiver, in operation, transmits downlink control information, DCI, including a field, and if the signal is to be received or transmitted in accordance with the hopping pattern, the field carries the hopping pattern indicator, else if signal is not to be received or transmitted in accordance with the hopping pattern, the field carries a bandwidth part indicator indicating an active bandwidth part on which the signal is to be received or transmitted in least one TTI.

In some embodiments, the circuitry, in operation, generates downlink control information, DCI including the hopping pattern indicator, the length of the DCI indicating determine whether or not the hopping pattern indicator is signaled.

In some embodiments, the hopping pattern indicator is semi-statically signaled, and the hopping presence indicator determines whether or not the hopping pattern indicator is signaled.

In some embodiments, the circuitry, in operation, further generates an initial bandwidth part indicator specifying a bandwidth part on which the signal is to be received or transmitted in the initial TTI of the plurality of TTIs. The transceiver, in operation, further transmits the initial bandwidth part indicator to the communication device, the initial bandwidth part indicator being semi-statically signaled. Further, the transceiver, in operation, receives or transmits the signal in the initial TTI in the bandwidth part specified by the initial bandwidth part indicator.

In some exemplary embodiments, the signal received or transmitted in the plurality of TTIs is a sequence of repetitions or retransmissions.

Moreover, in some embodiments, the hopping pattern indicator transmitted to the communication device is a first hopping pattern indicator indicating a first hopping pattern for a first signal. The circuitry, in operation, further generates a second hopping pattern indicator specifying a second hopping pattern for a second signal, the second hopping pattern being different from the first hopping pattern. The transceiver, in operation, further transmits the second hopping pattern indicator to the communication device. The transceiver, in operation, further receives or transmits the second signal according to the second hopping pattern.

For instance, the first signal is data and the second signal is control information.

In some particular examples, the control information (second signal) includes repetitions of the first hopping pattern indicator.

Further, for instance, the first and the second signal are respective sequences of transmissions or retransmissions.

In an embodiment, the disclosure provides a method for receiving or transmitting a signal from/to a base station in a wireless communication system in at least one of a plurality of bandwidth parts, a bandwidth part being formed by at least one physical resource block. The method comprises the following steps to be performed by a communication device: receiving, from the base station, a hopping pattern indicator specifying a hopping pattern, a hopping pattern being an order of the plurality of bandwidth parts by which the signal is to be received or transmitted in a plurality of transmission time intervals, TTIs; evaluating the hopping pattern indicator to determine the hopping pattern; and receiving or transmitting the signal in the plurality of TTIs according to the hopping pattern.

In an embodiment, a method is provided for transmitting or receiving a signal to/from a communication device in a wireless communication system in at least one of a plurality of bandwidth parts, a bandwidth part being formed by at least one physical resource block. The method comprises the following steps to be performed by a base station: defining a hopping pattern, a hopping pattern being an order of the plurality of bandwidth parts by which the signal is to be transmitted or received in a plurality of transmission time intervals; generating a hopping pattern indicator specifying the hopping pattern; transmitting the hopping pattern indicator to the communication device; and transmitting or receiving the signal in the plurality of TTIs according to the hopping pattern.

In an embodiment, provided is a computer readable medium storing executable instructions. The instructions, when executed, cause a communication device to perform the steps of the above method for transmitting or receiving a signal to/from a base station.

In an embodiment, provided is a computer readable medium storing executable instructions. The instructions, when executed, cause a base station to perform the steps of the above method for transmitting or receiving a signal to/from a communication device.

Summarizing, the disclosure relates to a communication device for receiving or transmitting a signal from/to a base station in a wireless communication system in at least one of a plurality of bandwidth parts, a bandwidth part being formed by at least one physical resource block, a base station, and respective methods for a communication device and a base station. The communication device comprises a transceiver which, in operation, receives, from the base station, a hopping pattern indicator specifying a hopping pattern, a hopping pattern being an order of the plurality of bandwidth parts by which the signal is to be received or transmitted in a plurality of transmission time intervals, TTIs. The communication device further comprises circuitry which, in operation, evaluates the hopping pattern indicator to determine the hopping pattern. The transceiver, in operation, further receives or transmits the signal in the plurality of TTIs according to the hopping pattern.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit configured to operate a communication device, the integrated circuit comprising:
    transceiver circuitry, which, in operation, receives, from a base station, downlink control information, DCI, including a hopping pattern indicator, a hopping pattern being an order of a plurality of bandwidth parts by which a signal is to be received or transmitted in a plurality of transmission time intervals, TTIs, a bandwidth part being formed by at least one physical resource block; and
    control circuitry which, in operation, determines whether the hopping pattern indicator is signaled based on a length of the DCI, and determines a hopping pattern to be applied based on the hopping pattern indicator;
    wherein the transceiver circuitry, in operation, further receives or transmits the signal in the plurality of TTIs according to the determined hopping pattern.

2. The integrated circuit according to claim 1, wherein the transceiver circuitry receives downlink control information, DCI, including the hopping pattern indicator.

3. The integrated circuit according to claim 1 wherein
    the transceiver circuitry, in operation, further receives, from the base station, a hopping presence indicator indicating whether or not the signal is to be received or transmitted in accordance with the hopping pattern, the hopping presence indicator being semi-statically signaled, and
    the control circuitry, in operation, evaluates the hopping presence indicator to determine whether or not the signal is to be received or transmitted according to the hopping pattern.

4. The integrated circuit according to claim 3, wherein, the transceiver circuitry, in operation, receives downlink control information, DCI, including a field, and
    if the control circuitry determines that the signal is to be received or transmitted in accordance with the hopping pattern, the field carries the hopping pattern indicator, else
    if the control circuitry determines that the signal is not to be received or transmitted in accordance with the hopping pattern, the field carries a bandwidth part indicator indicating an active bandwidth part on which the signal is to be received or transmitted in least one TTI.

5. The integrated circuit according to claim 3, the hopping pattern indicator being semi-statically signaled, wherein the control circuitry, in operation, evaluates the hopping presence indicator to determine whether or not the hopping pattern indicator is signaled.

6. The integrated circuit according to claim 1, wherein the transceiver circuitry, in operation, receives an initial bandwidth part indicator, the initial bandwidth part indicator being semi-statically signaled and specifying a bandwidth part on which the signal is to be received or transmitted in the initial TTI of the plurality of TTIs,
    the control circuitry, in operation, evaluates the initial bandwidth part indicator to determine the bandwidth part on which the signal is to be received in the initial TTI, and
    the transceiver circuitry, in operation, receives or transmits the signal in the initial TTI in the bandwidth part specified by the initial bandwidth part indicator.

7. The integrated circuit according to claim 1, the signal received or transmitted in the plurality of TTIs being a sequence of repetitions or retransmissions.

8. The integrated circuit according to claim 1, the hopping pattern indicator received from the base station being a first hopping pattern indicator indicating a first hopping pattern for a first signal, wherein
    the transceiver circuitry, in operation, receives, from the base station, a second hopping pattern indicator specifying a second hopping pattern for a second signal, the second hopping pattern being different from the first hopping pattern,
    the control circuitry, in operation, evaluates the second hopping pattern indicator to determine the second hopping pattern, and
    the transceiver circuitry, in operation, receives or transmits the second signal according to the second hopping pattern.

9. The integrated circuit according to claim 8, the first signal being data and the second signal being control information.

10. The integrated circuit according to claim 9, the control information including repetitions of the first hopping pattern indicator.

11. The integrated circuit according to claim 8, the first and the second signal being respective sequences of transmissions or retransmissions.

* * * * *

UNITED STATES PATENT AND TRADEMARK OFFICE
CERTIFICATE OF CORRECTION

| | | |
|---|---|---|
| PATENT NO. | : 11,664,845 B2 | Page 1 of 1 |
| APPLICATION NO. | : 17/364353 | |
| DATED | : May 30, 2023 | |
| INVENTOR(S) | : Ankit Bhamri et al. | |

It is certified that error appears in the above-identified patent and that said Letters Patent is hereby corrected as shown below:

On the Title Page

<u>ON PAGE 2, Column 2, ITEM (56) REFERENCES CITED/OTHER PUBLICATIONS:</u>
"Extended European Search Report, dated August 21, 2018, for European Application No. 1815 8478.0-1220, 11 pages."
Should read:
--Extended European Search Report, dated August 21, 2018, for European Application No. 18158478.0-1220, 11 pages.--

Signed and Sealed this
Fourth Day of July, 2023

Katherine Kelly Vidal
*Director of the United States Patent and Trademark Office*